United States Patent
Panse et al.

(10) Patent No.: US 10,683,030 B2
(45) Date of Patent: Jun. 16, 2020

(54) FLUID FLOW CONTROL MECHANISM FOR A STEERING WHEEL EMULATOR

(71) Applicant: GM GLOBAL TECHNOLOGY OPERATIONS LLC, Detroit, MI (US)

(72) Inventors: Satish Panse, Clawson, MI (US); Mauro Pacheco Escobedo, Troy, MI (US); Michael C. Gaunt, Metamora, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 126 days.

(21) Appl. No.: 15/712,716

(22) Filed: Sep. 22, 2017

(65) Prior Publication Data

US 2019/0092376 A1    Mar. 28, 2019

(51) Int. Cl.
  *B62D 5/00* (2006.01)
  *B60R 25/02* (2013.01)
  *B62D 5/09* (2006.01)
  *B62D 6/00* (2006.01)

(52) U.S. Cl.
  CPC ........... *B62D 5/006* (2013.01); *B60R 25/02* (2013.01); *B62D 5/005* (2013.01); *B62D 5/091* (2013.01); *B62D 6/003* (2013.01); *B62D 6/008* (2013.01)

(58) Field of Classification Search
  CPC ....................................... B60R 25/02
  See application file for complete search history.

(56) References Cited

U.S. PATENT DOCUMENTS

| | | | | |
|---|---|---|---|---|
| 5,803,202 A | * | 9/1998 | Bohner | B62D 5/006 180/402 |
| 10,029,725 B2 | * | 7/2018 | Schulz | B62D 5/006 |
| 2002/0157894 A1 | * | 10/2002 | Hjelsand | B62D 5/003 180/446 |
| 2002/0189888 A1 | * | 12/2002 | Magnus | B62D 5/006 180/402 |
| 2012/0125141 A1 | * | 5/2012 | Rosenmaier | B62D 5/006 74/499 |
| 2017/0210411 A1 | * | 7/2017 | Kogure | B62D 5/0403 |

* cited by examiner

*Primary Examiner* — Jess Whittington
(74) *Attorney, Agent, or Firm* — Cantor Colburn LLP

(57) ABSTRACT

A steer-by-wire assembly includes a steering wheel, a steering column coupled to the steering wheel, and a fluid-flow control mechanism coupled to the steering column, wherein the fluid-flow control mechanism is configured to adjust a torque on the steering column. The fluid-flow control mechanism includes a housing defining a cavity, and a flow control valve in fluid communication with the cavity of the housing. The flow control valve is configured to control a flow of a fluid in the cavity of the housing to adjust the torque on the steering wheel. The fluid-flow control mechanism includes a shaft and a piston coupled to the shaft such that translation of the piston causes the shaft to rotate.

9 Claims, 3 Drawing Sheets

FLUID FLOW CONTROL MECHANISM FOR A STEERING WHEEL EMULATOR

INTRODUCTION

The present disclosure relates to a fluid-flow control mechanism for a steering wheel emulator.

Vehicles include a steering assembly for steering. In some vehicles, the steering assembly includes a steering wheel. A vehicle operator can rotate the steering wheel to steer the vehicle.

SUMMARY

The present discloses describes, among other things, the use of a pneumatic/hydraulic system to provide the functionality of variable mechanical end stop for the steering wheel of a steer-by-wire assembly. In addition, the present disclosure describes, among other things, the use of a pneumatic/hydraulic system to provide the functionality of locking the steering wheel of a steer-by-wire assembly. Further, the present disclosure describes, among other things, the use of a pneumatic/hydraulic system to provide the functionality achieving the desired steering wheel torque when the steering wheel emulator of a steer-by-wire assembly fails.

A steer-by-wire assembly includes a steering wheel, a steering column coupled to the steering wheel, and a fluid-flow control mechanism coupled to the steering column, wherein the fluid-flow control mechanism is configured to adjust a torque on the steering column. The fluid-flow control mechanism may include a housing defining a cavity, and a flow control valve in fluid communication with the cavity of the housing. The flow control valve is configured to control a flow of a fluid in the cavity of the housing to adjust the torque on the steering wheel. The fluid-flow control mechanism may include a shaft and a piston coupled to the shaft such that translation of the piston causes the shaft to rotate, thereby providing torsional feedback. The fluid flow control valve controls the position of the piston in the cavity to achieve the desired torsional feedback (e.g., assists/resist). The piston and the shaft are both disposed inside the housing. The fluid-flow control mechanism includes a spring coupled to the shaft and the piston to bias the piston's position toward a center of the cavity and the Steering Wheel to the straight head position. The fluid-flow control mechanism may include a reduction-gear set coupled to the shaft and the steering column, and the reduction-gear set is configured to reduce angular displacement in order to optimize the efficiency of the proposed mechanism. The spring is a first spring, and the fluid-flow control mechanism includes a second spring coupled to the cavity housing and the piston. The first spring and the second spring are configured to collectively bias the piston toward the center of the cavity, and the first spring is farther from the reduction-gear set than the second spring. The piston divides the cavity into a first compartment and a second compartment. The first compartment is farther from the reduction-gear set than the second compartment. The flow control valve is configured to allow and control the rate of the fluid flow from the first compartment to the second compartment to move the piston away from the center of the cavity.

The steer-by-wire assembly may further include a fluid source in fluid communication with the flow control valve, the flow control valve is a first flow control valve, the fluid-flow control mechanism includes a second flow control valve in fluid communication with the cavity of the housing. The piston divides the cavity of the housing into a first compartment and a second compartment. The first compartment is farther from the reduction-gear set than the second compartment. The first flow control valve is in direct communication with the first compartment of the cavity to allow fluid to flow into the first compartment to move the piston away from the reduction-gear set. The second flow control valve is in direct fluid communication with the second compartment to allow the fluid to flow into the second compartment to move the piston away from the reduction-gear set. The fluid source is a fluid reservoir. The fluid reservoir contains a fluid. The first flow control valve is configured to allow the fluid to flow from the fluid reservoir to the first compartment to move the piston toward the reduction-gear set. The steer-by-wire assembly is characterized by the absence of a spring coupled to the shaft. The steer-by-wire assembly further includes a steering wheel emulator coupled to the shaft, a controller in communication with the flow control valve, a steering angle sensor coupled to the steering column, and a steering torque sensor coupled to the steering column. The steering angle sensor is configured to measure a steering wheel angle on the steering wheel. The steering torque sensor is configured to measure a steering wheel torque on the steering wheel. The steering wheel emulator includes an electric motor coupled to the shaft to control a rotation of the shaft. The steering wheel emulator is in communication with the controller, and the controller is configured to control the flow control valve.

The controller is programmed to: determine that a vehicle that includes the steer-by-wire assembly is not in a key-on state; and in response to determining that the vehicle is not in key-on state, de-energize the flow control valve to close the flow control valve, thereby locking the steering wheel. The controller is programmed to: determine that a vehicle that includes the steer-by-wire assembly is in a key-on state; in response to determining that the vehicle is in the key-on state, open the flow control valve to allow the fluid to flow into the cavity of the housing; and determine that the vehicle is operating in an autonomous mode. In response to determining that the vehicle is operating in the autonomous mode, the controller is programmed to determine at least one of: the steering wheel angle is greater than a predetermined target value; and the steering wheel torque is greater than a predetermined-emulator torque threshold. In response to determining the steering wheel angle is greater than the predetermined target value or that the steering wheel torque is greater than a predetermined-emulator torque threshold, the controller is programmed to de-energize the flow control valve to close the flow control valve, thereby locking the steering wheel.

The controller is programmed to: determine that a vehicle that includes the steer-by-wire assembly is in a key-on state; in response to determining that the vehicle is in the key-on state, open the flow control valve to allow the fluid to flow into the cavity of the housing; determine that the vehicle is not operating in an autonomous mode; in response to determining that the vehicle is not operating in the autonomous mode, determine that the steering wheel emulator is in a failed state; in response to determining that the steering wheel emulator is in the failed state, determining that the steering wheel is off center; in response to determining that the steering wheel is off center, determining that the steering wheel is at an end of an allowed rotational angle; and in response to determining that the steering wheel is at the end of the allowed rotational angle, de-energize the flow control valve to close the flow control valve, thereby locking the steering wheel.

The controller is programmed to: determine that a vehicle that includes the steer-by-wire assembly is in a key-on state; in response to determining that the vehicle is in the key-on state, open the flow control valve to allow the fluid to flow into the cavity of the housing; determine that the vehicle is not operating in an autonomous mode; in response to determining that the vehicle is not operating in the autonomous mode, determine that the steering wheel emulator is in a failed state; in response to determining that the steering wheel emulator is in the failed state, determining that the steering wheel is off center; in response to determining that the steering wheel is off center, determining that the steering wheel is not at an end of an allowed rotational angle; in response to determining that the steering wheel is not at the end of the allowed rotational angle, determine a desired steering wheel torque as a function of a vehicle speed of the vehicle, the steering wheel angle, and a steering wheel velocity; and control the flow control valve to achieve the desired steering wheel torque.

The controller is programmed to: determine that a vehicle that includes the steer-by-wire assembly is in a key-on state; in response to determining that the vehicle is in the key-on state, open the flow control valve to allow the fluid to flow into the cavity of the housing; determine that the vehicle is not operating in an autonomous mode; in response to determining that the vehicle is not operating in the autonomous mode, determine that the steering wheel emulator is in a failed state; in response to determining that the steering wheel emulator is in the failed state, determining that the steering wheel is not off center; in response to determining that the steering wheel is not off center, determine a desired steering wheel torque as a function of a vehicle speed of the vehicle; and control the flow control valve to achieve the desired steering wheel torque.

The present disclosure also describes vehicles. In certain embodiments, the vehicle includes a vehicle body, a plurality of wheels coupled to the vehicle body, and a steer-by-wire assembly coupled to the plurality of wheels. The steer-by-wire assembly may include a steering wheel, a steering column coupled to the steering wheel, and a fluid-flow control mechanism coupled to the steering column. The fluid-flow control mechanism is configured to adjust a torque on the steering column. The fluid-flow control mechanism includes a housing defining a cavity, and a flow control valve in fluid communication with the cavity of the housing. The flow control valve is configured to control a flow of a fluid in the cavity of the housing to adjust the torsional resistance on the steering column. The fluid-flow control mechanism includes a shaft and a piston coupled to the shaft such that translation of the piston provides torsional feedback. The fluid flow control valve controls the position of the piston in the cavity to achieve the desired torsional feedback (assist/resist). The piston and the shaft are both disposed inside the housing. The fluid-flow control mechanism includes a spring coupled to the shaft and the piston to bias the piston's position toward a center of the cavity and the Steering Wheel to the straight ahead position. The fluid-flow control mechanism may include a reduction-gear set coupled to the shaft and the steering column, and the reduction-gear set is configured to reduce angular displacement in order to optimize the efficiency of the proposed mechanism. The spring is a first spring, and the fluid-flow control mechanism includes a second spring coupled to the cavity housing and the piston. The first spring and the second spring are configured to collectively bias the piston toward the center of the cavity, the first spring is farther from the reduction-gear set than the second spring. The piston divides the cavity into a first compartment and a second compartment. The first compartment is farther from the reduction-gear set than the second compartment. The flow control valve is configured to allow and control the rate of fluid flow from the first compartment to the second compartment to move the piston away from the center of the cavity.

The above features and advantages and other features and advantages of the present disclosure are readily apparent from the following detailed description of the best modes for carrying out the disclosure when taken in connection with the accompanying drawings.

DETAILED DESCRIPTION

Figure 1:
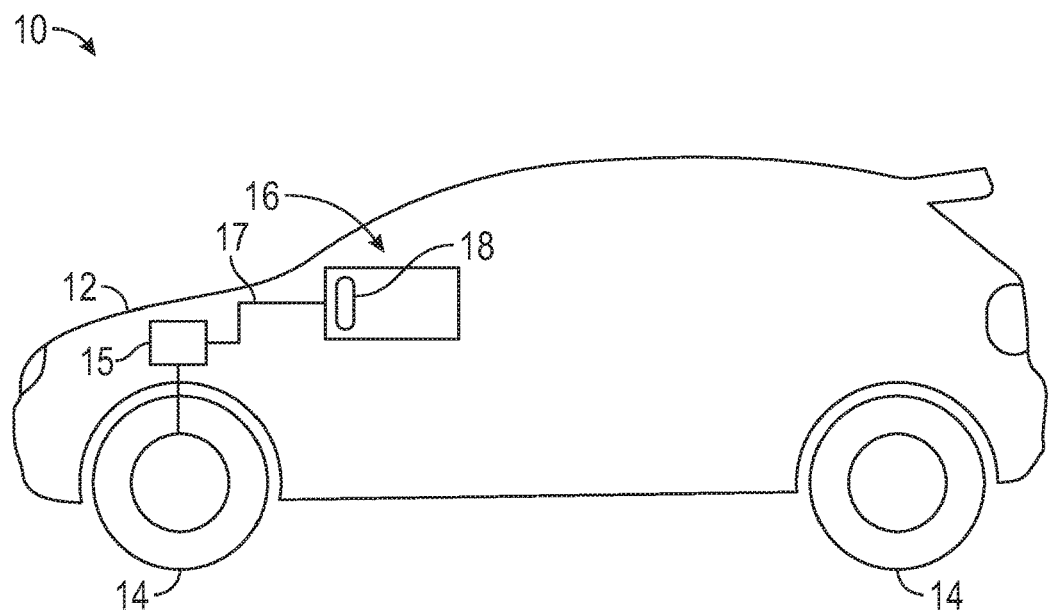
FIG. 1 is a schematic side view of a vehicle including a steer-by-wire assembly.

With respect to FIG. 1, a vehicle 10 includes a vehicle body 12 and one or more wheels 14. The wheels 14 can rotate relative to the vehicle body 12 to assist in propelling the vehicle 10. The vehicle 10 further includes a steer-by-wire assembly 16 to steer at least one of the wheels 14 to steer the vehicle 10 in a desired direction. In the present disclosure, the term "steer-by-wire assembly" means assembly in which there is no mechanical connection between a steering wheel 18 and the wheels 14. Rather, in the steer-by-wire assembly 16, electrical wires 17 electrically connect the steering wheel 18 and the wheels 14. Thus, in the steer-by-wire assembly 16, no force or torque is transferred between the steering wheel 18 and the wheels 14. The vehicle 10 further includes a vehicle speed sensor 15 coupled to the wheels 14 and/or the vehicle body 12. The vehicle speed sensor 15 is configured to measure the vehicle speed of the vehicle 10. Further, the vehicle speed sensor 15 may be in communication with the steer-by-wire assembly 16.

Figure 2:
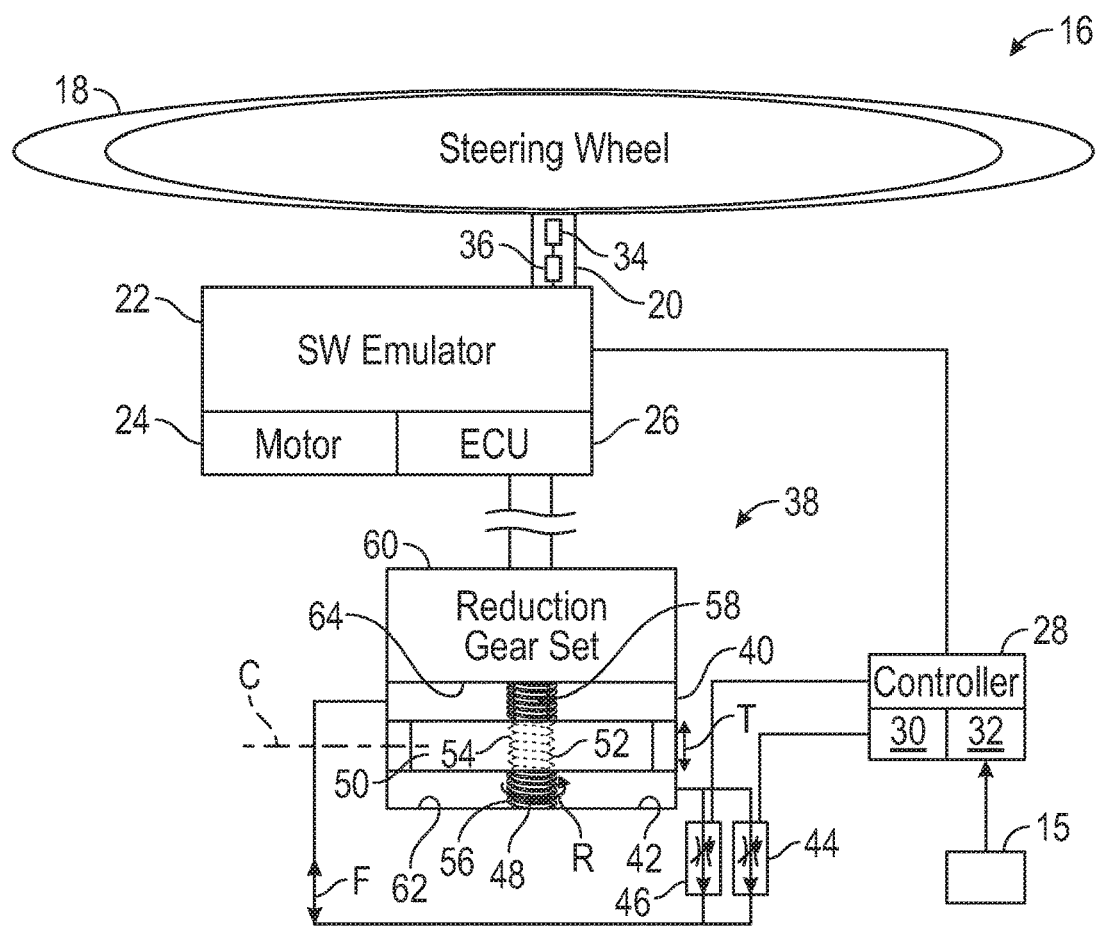
FIG. 2 is a schematic diagram of a steer-by-wire assembly of the vehicle shown in FIG. 1.

With respect to FIG. 2, the steer-by-wire assembly 16 includes the steering wheel 18 and a steering column 20 coupled to the steering wheel 18. As such, the steering wheel 18 and the steering column 20 are configured to rotate in unison. The steer-by-wire 16 further includes a steering wheel emulator 22 coupled to the steering column 20. The steering wheel emulator 22 includes an electric motor 24 and an electronic control unit ("ECU") 26 in communication with the electric motor 24. The ECU 26 and the electric motor 24 are configured to collectively control the torque on the steering column 20. For instance, the electric motor 24 is configured to control the rotation of the steering column 20. The steer-by-wire assembly 16 further includes a controller 28, which may also be referred to as an electronic control unit.

The controller 28 is in electronic communication with the vehicle speed sensor 15 and includes a processor 30, such as a microprocessor, and a memory 32, such as a non-transitory memory, in communication with the processor 30. The terms controller, control module, module, control, control unit, processor and similar terms refer to any one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit(s), input/output circuit(s) and devices, signal conditioning and buffer circuitry and other components to provide a described functionality. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of an event. Communications between controllers and between controllers, actuators and/or sensors may be accomplished using a direct wired link, a networked communications bus link, a wireless link or any another suitable communications link. The term 'model' refers to a processor-based or processor-executable code and associated calibration that simulates a physical existence of a device or a physical process.

The steer-by-wire assembly 16 further includes a steering angle sensor 34 coupled to the steering column 20. The steering angle sensor 34 is configured to determine the steering angle of the steering column 20 and/or the steering wheel 18. The steer-by-wire assembly 16 further includes a steering torque sensor 36 coupled to the steering column 20. The steering angle sensor 34 is configured to measure the steering angle on the steering column 20 and/or the steering wheel 18. The steering torque sensor 36 is configured to measure the steering torque on the steering column 18 and/or the steering wheel 18.

The steer-by-wire assembly 16 further includes a fluid-flow control mechanism 38 coupled to the steering column 20. In the depicted embodiment, the fluid-flow control mechanism 38 converts rotational motion into translation, and vice-versa, using fluid flow. However, it is envisioned that the fluid-flow mechanism 38 may referred to any suitable mechanism capable of providing rotational resistance or rotational assistance to the steering wheel 18 by fluid flow management. Thus, the term "fluid-flow control mechanism" means a mechanism capable of providing rotational resistance or rotational assistance to a steering wheel by fluid flow management. The fluid-flow control mechanism 38 is configured to adjust a torque on the steering column 20 and/or the steering wheel 18. The fluid-flow control mechanism 38 includes a housing 40 defining a cavity 42. The fluid-flow control mechanism 38 further includes a first flow control valve 44 in fluid communication with the cavity 42 of the housing 40. In addition, the fluid-flow control mechanism 38 includes a second flow control valve 46 in fluid communication with the cavity 42 of the housing 40. Each of the first flow control valve 44 and the second flow control valve 46 is configured to control a flow of a fluid F (gas or liquid) into or out of the cavity 42 of the housing 40 to adjust the torsional resistance on the steering column 20 and/or the steering wheel 18. Each of the first flow control valve 44 and the second flow control valve 46 is in electronic communication with the controller 28. Accordingly, the controller 28 can control the opening and closing of the first flow control valve 44 and/or the second flow control valve 46. In the depicted embodiment, each of the first flow control valve 44 and the second flow control valve 46 may be normally closed. Although one flow control valve is sufficient, the fluid-flow control mechanism 38 may include two control valves (i.e., the first flow control valve 44 or the second flow control valve 46) for redundancy and to satisfy availability requirements.

The fluid-flow control mechanism 38 includes a shaft 48 and a piston 50 coupled to the shaft 48. As such, translation of the piston 50 (along the direction indicated by double arrow T) causes the shaft 48 to rotate. The piston 50 and the shaft 48 are both disposed inside the housing 40. The piston 50 includes internal threads 52, and the shaft 48 includes external threads 52 configured to threadedly engage the internal threads 52 of the piston 50. Accordingly, translation of the piston 50 along the direction indicated by double arrow T causes the shaft 48 to rotate, for example, along the direction R. Rotation of the shaft 48 causes translation of the piston 50.

The fluid-flow control mechanism 38 includes a first spring 56 coupled to the housing 40 and the piston 50 to bias the piston 50 toward a center C of the cavity 42 of the housing 40. The fluid-flow control mechanism 38 further includes a second spring 58 coupled to the housing 40 and the piston 50 to bias the piston 50 toward the center C of the cavity 42. For example, the first spring 56 and the second spring 58 collectively bias the piston 50 toward the center C of the cavity 42 of the housing 40. The first spring 56 and the second spring 58 may be compression coil spring. The fluid-flow control mechanism 38 includes a reduction-gear set 60 mechanically coupled to the shaft 48 and the steering column 20. The reduction-gear set 60 is configured to adjust the torsional resistance on the steering column 20 and/or the steering wheel 18 in response to the rotation of the shaft 48. In the depicted embodiment, the first spring 56 is farther from the reduction-gear set 60 than the second spring 58 to enable the first spring 56 and the second spring 58 to collectively bias the piston 50 toward the center C of the cavity 42.

The piston 50 divides the cavity 42 into a first compartment 62 and a second compartment 64. The first compartment 62 and the second compartment 64 may be the same size to facilitate biasing the piston 50 toward the center C of the cavity 42. The first compartment 62 is farther from the reduction-gear set 60 than the second compartment 64. The first flow control valve 44 and the second flow control valve 46 are each configured to allow the fluid F from the first compartment 62 to the second compartment 64 to move the piston 50 away from the reduction-gear set 60. The first flow control valve 44 is direct communication with the first compartment 62 and the second compartment 64 of the cavity 42 to allow the fluid F to flow between the first compartment 62 and the second compartment 64 to move the piston 50 away or toward the reduction-gear set 60. The second flow control valve 46 is in direct fluid communication with the first compartment 62 and the second compartment 64 to allow the fluid F to flow between the first compartment 62 and the second compartment 64 to move the piston 50 away or toward the reduction-gear set 60.

Figure 3:
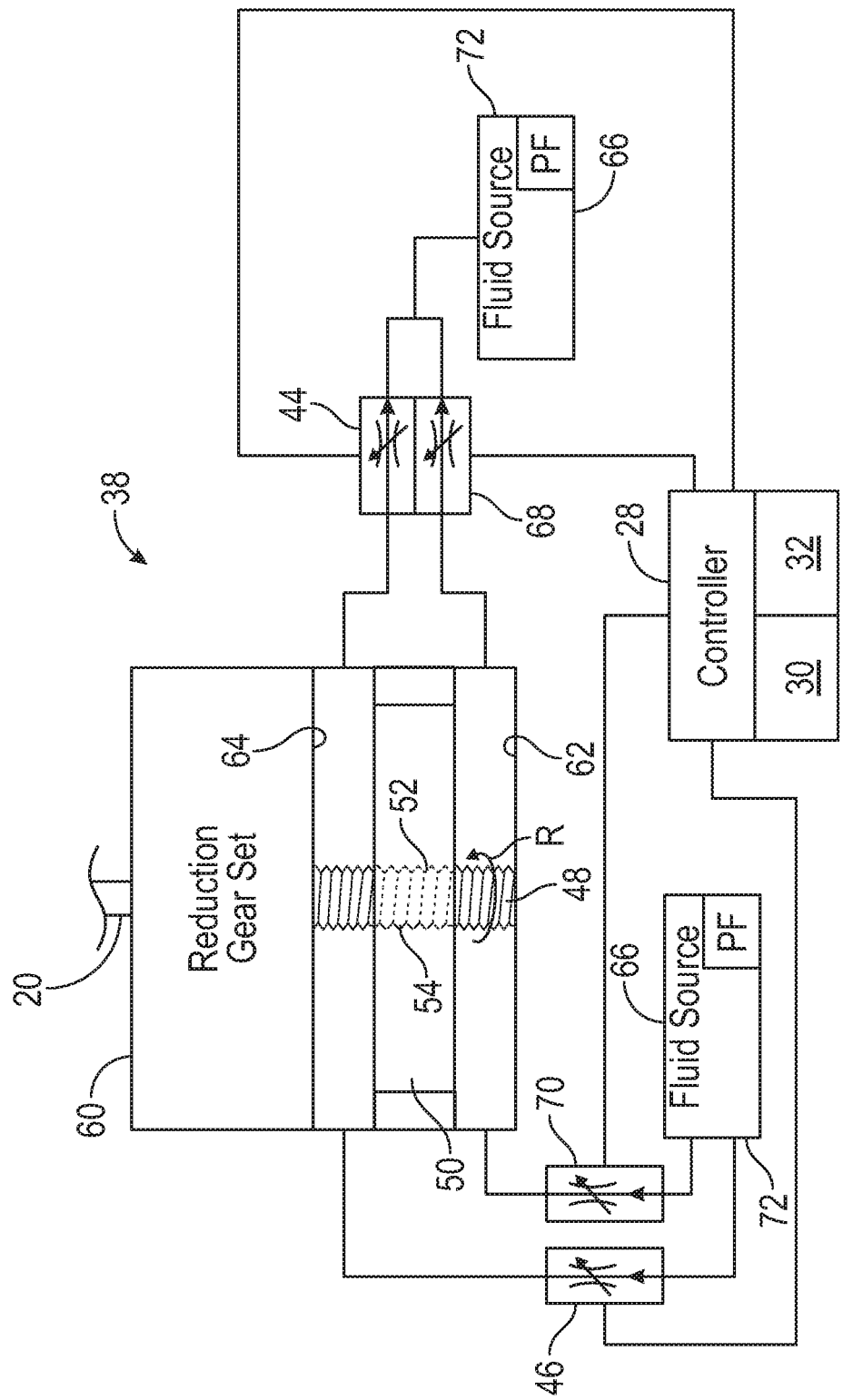
FIG. 3 is a schematic diagram of a steer-by-wire assembly for the vehicle shown in FIG. 1.

With reference to FIG. 3, the structure and operation of this embodiment is substantially similar to the structure and operation of the embodiment described above except for the features described below. In this embodiment, a pressurized fluid source (FS) 66 is in fluid communication with the first flow control valve 44 and the second flow control valve 46. The fluid-flow control mechanism 38 may additionally include a third flow control valve 68 and a fourth flow control valve 70 each in fluid communication with the fluid source 66. The fluid source 66 may be a fluid reservoir 72 of the vehicle 10. One or both of the fluid reservoir 72 contains a pressurized fluid PF, such as a brake fluid. The first flow control valve 44 and the third flow control valve 68 are in direct fluid communication with the first compartment 62 to allow the fluid PF from the fluid reservoir 72 to flow into the first compartment to move the piston 50 toward the reduction-gear set 60. The second flow control valve 46 and the fourth flow control valve 70 are in direct fluid communication with the second compartment 64 to allow the pressurized fluid PF from the fluid reservoir 72 to flow into the second compartment to move the piston 50 away from the reduction-gear set 60. In this embodiment, no spring is coupled to the shaft 48.

Figure 4:
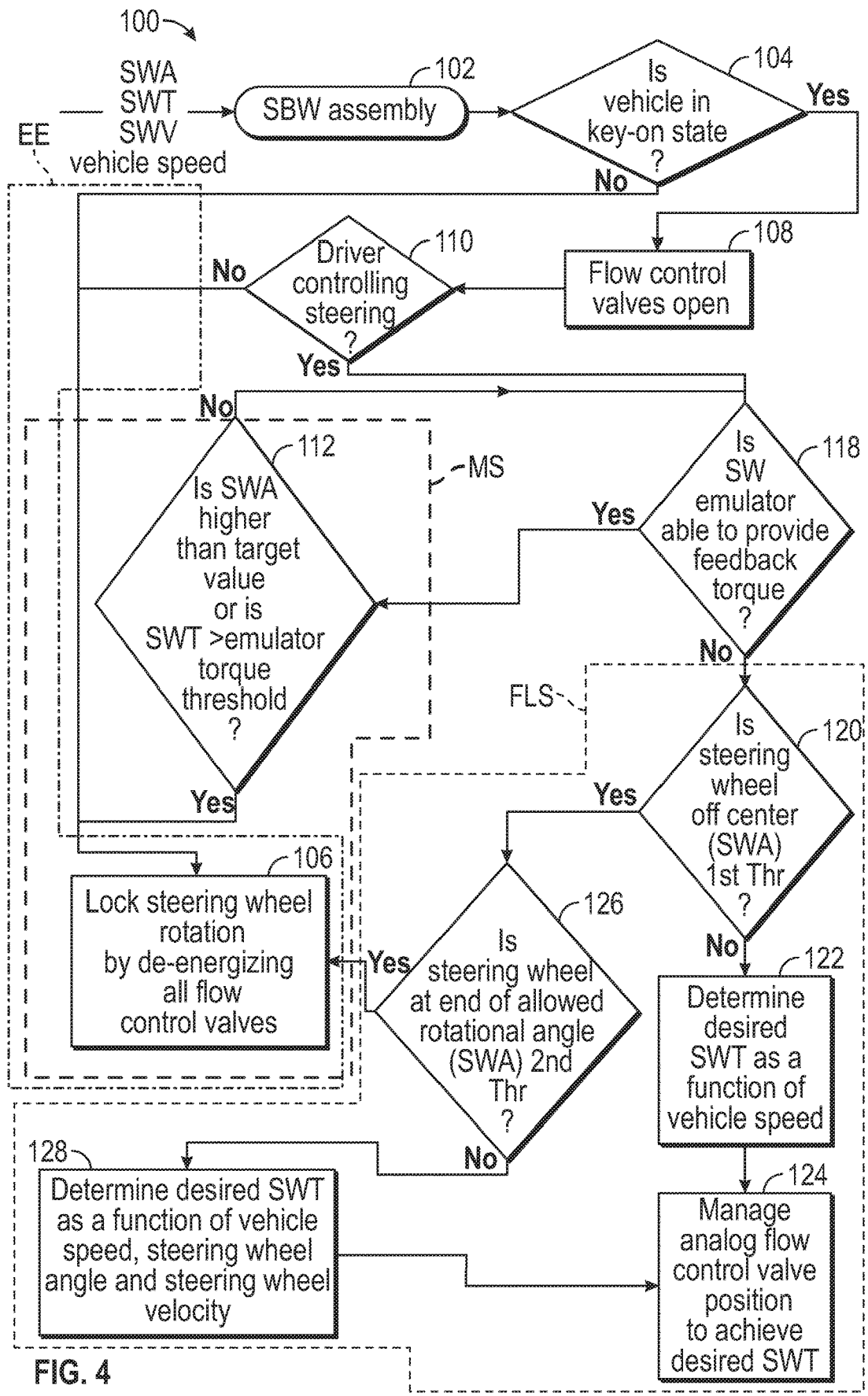
FIG. 4 is a flowchart of a method for controlling a steer-by-wire assembly.

FIG. 4 is a flowchart of a method 100 for controlling the steer-by-wire assembly 16. The method 100 begins at step 102, in which the controller 28 of the steer-by-wire assembly 16 receives several inputs, namely: the steering wheel angle (SWA) from the steering angle sensor 34; the steering wheel torque (SWT) from the steering torque sensor 36; the steering wheel velocity (SWV) that is determined by calculating on the steering wheel angle over time; and the vehicle speed from the vehicle speed sensor 15. Then, the method 100 proceeds to step 104. At step 104, the controller 28 determines whether the vehicle 10 is on a key-on state based on input signal, for example, received from the ignition switch. The "key-on state" means a state of the vehicle in which a vehicle key is inserted into (or otherwise connected to) the ignition switch of the vehicle 10, thereby allowing a vehicle operator to start the vehicle engine and/or motor. If the vehicle 10 is not in the key-on state, then the method 100 proceeds to step 106. In step 106, the controller 28 de-energizes all the flow control valves (i.e., the first flow control valve 44 and the second flow control valve 46 in the embodiment depicted in FIG. 2, and the first flow control valve 44, the second flow control valve 46, the third flow control valve 68, and the fourth flow control valve 70 in the embodiment depicted in FIG. 3). As a result, the flow control valves close (e.g., the first flow control valve 44 and the second flow control valve 46), thereby locking the position of the piston 50. Consequently, the steering wheel 18 is locked and cannot rotate. In other words, at this point, the steering wheel 18 remains stationary. The steps enclosed by the dashed lines EE are part of the entry/egress stationary wheel functionality of the steer-by-wire assembly 16. When the vehicle 10 is not in the key-on state, it is desirable to lock the steering wheel 18 so that the vehicle operator can hold the steering wheel 18 while entering or exiting the vehicle 10 to facilitate entry and exit from the vehicle 10.

If the vehicle 10 is in the key-on state at step 104, then the method 100 proceeds to step 108. At step 108, the controller 28 commands the flow control valves (i.e., the first flow control valve 44 and the second flow control valve 46 in the embodiment depicted in FIG. 2, and the first flow control valve 44, the second flow control valve 46, the third flow control valve 68, and the fourth flow control valve 70 in the embodiment depicted in FIG. 3) to open to allow the fluid F to flow into the cavity 42 of the housing 40.

Then, the method 100 proceeds to step 110. At step 110, the controller 28 determines whether the vehicle 10 is operating in an autonomous mode or a driver mode based, for example, on input signals from a user interface of the vehicle 10. The user interface of the vehicle 10 may include a button that allows a vehicle operator to switch between autonomous mode and drive mode. In the autonomous mode, the vehicle operator does not need to steer the vehicle 10 because the vehicle 10 steers automatically, whereas, in the driver mode, the vehicle operator employs the steering wheel 18 to manually steer the vehicle 10. If the vehicle 10 is operating in an autonomous mode, then the method proceeds to step 112. On the other hand, if the vehicle 10 is operating in the driver mode (i.e., if the driver is controlling steering), then the method 100 proceeds to step 118.

At step 112, the controller 28 determines if either the steering wheel angle (SWA) is greater than a predetermined target value or the steering wheel torque (SWA) is greater than a predetermined-emulator torque threshold. If either the steering wheel angle (SWA) is greater than a predetermined target value or the steering wheel torque (SWA) is greater than a predetermined-emulator torque threshold, then the method 100 proceeds to step 106. As discussed above, in step 106, the controller 28 de-energizes all the flow control valves (i.e., the first flow control valve 44 and the second flow control valve 46 in the embodiment depicted in FIG. 2, and the first flow control valve 44, the second flow control valve 46, the third flow control valve 68, and the fourth flow control valve 70 in the embodiment depicted in FIG. 3). As a result, the flow control valves close (e.g., the first flow control valve 44 and the second flow control valve 46), thereby locking the position of the piston 50. Consequently, the steering wheel 18 is locked and cannot rotate. In other words, at this point, the steering wheel 18 remains stationary. The steps enclosed by the dashed lines MS are part of the variable steering wheel mechanical stop functionality of the steer-by-wire assembly 16. When the vehicle 10 is in the autonomous mode, it is desirable to lock the steering wheel 18 when the steering wheel 18 reaches its rotational end stops.

If neither the steering wheel angle (SWA) is greater than the predetermined target value or the steering wheel torque (SWA) is greater than the predetermined-emulator torque threshold, then the method 100 proceeds to step 118. At step 118, it is determined, for example by the controller 28, whether the steering wheel emulator 22 is in a failed state. To do so, the controller 28 may, for example, determine whether the steering wheel emulator 22 is able to provide feedback torque. If the steering wheel emulator 22 is able to provide feedback torque and is therefore not operating in a failed state, then the method 100 proceeds to step 112. If the steering wheel emulator 22 is not able to provide feedback torque and is therefore operating in the failed state, then the method 100 proceeds to step 120. At step 120, the controller 28 determines whether the steering wheel 18 is off center. To do so, the controller 28 may determine whether the absolute value of the steering wheel angle is greater than a first predetermined-angle threshold ($1^{st}$Thr.). If the steering wheel angle is greater than a first predetermined-angle threshold, then the steering wheel 18 is off center. If the steering wheel 18 is not off center, then the method 100 proceeds to step 122. At step 122, the controller 28 determines a desired steering wheel torque based on the vehicle speed of the vehicle 10. The vehicle 10 may be tested on a track to produce calibration look-up tables to determine the desired steering wheel torque as a function of a vehicle speed of the vehicle 10. Accordingly, the controller 28 may determine the desired steering wheel torque as a function of vehicle speed of the vehicle 10. After step 122, the method 100 proceeds to step 124. At step 124, the controller 28 controls opening and closing of the flow control valves (i.e., the first flow control valve 44 and the second flow control valve 46 in the embodiment depicted in FIG. 2, and the first flow control valve 44, the second flow control valve 46, the third flow control valve 68, and the fourth flow control valve 70 in the embodiment depicted in FIG. 3) to achieve the desired steering wheel torque (SWT).

If the steering wheel 18 is off center (i.e., 0 degrees steering wheel angle), then the method 100 proceeds to step 126. At step 126, the controller 28 determines whether the steering wheel 18 is at an end of an allowed rotational angle. To do so, the controller 28 determines if the absolute value of the steering wheel angle is greater than a second predetermined-angle threshold $2^{nd}$Thr.) The second predetermined-angle threshold is great the first predetermined-angle threshold. If the absolute value of the steering wheel angle is greater than the second predetermined-angle threshold then, the steering wheel 18 is at the end of the allowed rotational angle. If the steering wheel 18 is not at the end of the allowed rotational angle, then the method 100 proceeds to step 128. At step 128, the controller 28 determines a desired steering wheel torque (SWT) based on the vehicle speed of the vehicle 10, the steering wheel angle of the steering wheel 18, and the steering wheel velocity. The vehicle 10 may be tested on a track to produce calibration look-up tables to determine the desired steering wheel torque as a function of the vehicle speed of the vehicle 10, the steering angle of the steering wheel 18, and the steering wheel velocity of the steering wheel 18. Accordingly, the controller 28 may determine the desired steering wheel torque as a function of function of the vehicle speed of the vehicle 10, the steering angle of the steering wheel 18, and the steering wheel velocity of the steering wheel 18. In the embodiment described in FIG. 2, at step 128, the fluid-flow control mechanism 38 provides a constant restoring force on the steering wheel 18 as a function of the compression springs (i.e., the first spring 56 and the second spring 58). Thus, the fluid-flow control mechanism 38 shown in FIG. 2 passively manages the torsional resistance on steering wheel 18. In the embodiment described in FIG. 3, at step 128, the fluid-flow control mechanism 38 provides a controlled changing restoring force on the steering wheel 18 as a function of pressurized fluid supply and valve control. Thus, the fluid-flow control mechanism 38 shown in FIG. 3 actively manages the torsional resistance on steering wheel 18. After step 122, the method 100 proceeds step 124. As discussed above, at step 124, the controller 28 controls opening and closing of the flow control valves (i.e., the first flow control valve 44 and the second flow control valve 46 in the embodiment depicted in FIG. 2, and the first flow control valve 44, the second flow control valve 46, the third flow control valve 68, and the fourth flow control valve 70 in the embodiment depicted in FIG. 3) to achieve the desired steering wheel torque (SWT).

If the steering wheel 18 is at the end of the allowed rotational angle, then the method 100 proceeds to step 106. In step 106, the controller 28 de-energizes all the flow control valves (i.e., the first flow control valve 44 and the second flow control valve 46 in the embodiment depicted in FIG. 2, and the first flow control valve 44, the second flow control valve 46, the third flow control valve 68, and the fourth flow control valve 70 in the embodiment depicted in FIG. 3). As a result, the flow control valves close (e.g., the first flow control valve 44 and the second flow control valve 46), thereby locking the position of the piston 50. Consequently, the steering wheel 18 is locked and cannot rotate.

The steps enclosed by the dashed lines FLS are part of the variable steering wheel emulator failed state functionality. When the steering wheel emulator 22 is in a failed state, is desirable to adjust the torsional resistance on the steering wheel 18 according to the operating parameters of the steering wheel 18 and the vehicle 10 discussed above.

While the best modes for carrying out the disclosure have been described in detail, those familiar with the art to which this disclosure relates will recognize various alternative designs and embodiments for practicing the disclosure within the scope of the appended claims.

What is claimed is:

1. A steer-by-wire assembly, comprising:
a steering wheel;
a steering column coupled to the steering wheel; and
a fluid-flow control mechanism coupled to the steering column, wherein the fluid-flow control mechanism is configured to adjust a torsional resistance on the steering column, wherein the fluid-flow control mechanism includes a housing defining a cavity, a flow control valve in fluid communication with the cavity of the housing, a shaft, and a piston in physical contact with the shaft such that translation of the piston causes the shaft to rotate, wherein the piston and the shaft are both disposed inside the housing, and the flow control valve is configured to control a flow of a fluid in the cavity of the housing to adjust the torsional resistance on the steering wheel.

2. The steer-by-wire assembly of claim 1, wherein the fluid-flow control mechanism includes a spring coupled to shaft and the piston to bias the piston toward a center of the cavity.

3. The steer-by-wire assembly of claim 2, wherein the fluid-flow control mechanism includes a reduction-gear set coupled to the shaft and the steering column, and the reduction-gear set is configured to adjust the torque on the steering column in response to a rotation of the shaft.

4. The steer-by-wire assembly of claim 3, wherein the spring is a first spring, and the fluid-flow control mechanism includes a second spring coupled to the shaft, the first spring and the second spring are configured to collectively bias the piston toward the center of the cavity, the first spring is farther from the reduction-gear set than the second spring.

5. The steer-by-wire assembly of claim 4, wherein the piston divides the cavity into a first compartment and a second compartment, the first compartment is farther from the reduction-gear set than the second compartment, wherein the flow control valve is configured to allow the fluid from the first compartment to the second compartment to move the piston away from the reduction-gear set.

6. The steer-by-wire assembly of claim 1, wherein the fluid-flow control mechanism is configured to provide a constant restoring force on the steering wheel as a function of compression springs.

7. The steer-by-wire assembly of claim 1, wherein the fluid-flow control mechanism is configured to provide a controlled changing restoring force on the steering wheel as a function of pressurized fluid supply and valve control.

8. A vehicle, comprising:
a vehicle body;
a plurality of wheels coupled to the vehicle body;
a steer-by-wire assembly coupled to the plurality of wheels, wherein the steer-by-wire assembly includes:
a steering wheel;
a steering column coupled to the steering wheel;
a fluid-flow control mechanism coupled to the steering column, wherein the fluid-flow control mechanism is configured to adjust a torque on the steering column and the fluid-flow control mechanism includes a shaft and a piston in physical contact with the shaft such that translation of the piston causes the shaft to rotate and the fluid-flow control mechanism includes:
a housing defining a cavity, wherein the piston and the shaft are both disposed inside the housing;

a flow control valve in fluid communication with the cavity of the housing; and wherein the flow control valve is configured to control a flow of a fluid in the cavity of the housing to adjust the torque on the steering wheel.

9. The vehicle of claim 8, wherein the fluid-flow control mechanism includes a spring coupled to shaft and the piston to bias the piston toward a center of the cavity.

* * * * *